United States Patent
Shih et al.

(10) Patent No.: US 11,395,247 B2
(45) Date of Patent: Jul. 19, 2022

(54) METHOD OF MONITORING PAGING OCCASIONS AND RELATED DEVICE

(71) Applicant: FG Innovation Company Limited, Tuen Mun (HK)

(72) Inventors: Mei-Ju Shih, Taipei (TW); Hung-Chen Chen, Taipei (TW); Yung-Lan Tseng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 6 days.

(21) Appl. No.: 17/107,213

(22) Filed: Nov. 30, 2020

(65) Prior Publication Data

US 2021/0168738 A1 Jun. 3, 2021

Related U.S. Application Data

(60) Provisional application No. 62/941,974, filed on Nov. 29, 2019.

(51) Int. Cl.
*H04W 56/00* (2009.01)
*H04W 68/02* (2009.01)
*H04W 72/04* (2009.01)

(52) U.S. Cl.
CPC ......... *H04W 56/001* (2013.01); *H04W 68/02* (2013.01); *H04W 72/042* (2013.01)

(58) Field of Classification Search
CPC .. H04W 56/001; H04W 68/02; H04W 72/042
See application file for complete search history.

(56) References Cited

U.S. PATENT DOCUMENTS

2017/0367069 A1 12/2017 Agiwal et al.
2018/0302889 A1 10/2018 Guo et al.
(Continued)

FOREIGN PATENT DOCUMENTS

CN 109076493 A 12/2018
WO 2018/190617 A1 10/2018

OTHER PUBLICATIONS

Nokia, Nokia Shanghai Bell: "Paging in NR-U", R2-1915058, 3GPP TSG-RAN WG2 Meeting #108, Reno, USA, Nov. 18-22, 2019.

(Continued)

*Primary Examiner* — Kyaw Z Soe
(74) *Attorney, Agent, or Firm* — ScienBiziP, P.C.

(57) ABSTRACT

A method of monitoring paging occasions for a user equipment (UE) is provided. The method includes determining whether a paging configuration indicating at least two physical downlink control channel (PDCCH) monitoring occasions associated with a synchronization signal block (SSB) in a paging occasion (PO) is received from a base station (BS), determining whether the UE is operated in an unlicensed spectrum, receiving an indication in a short message in a first PDCCH monitoring occasion of the at least two PDCCH monitoring occasions when it is determined that the UE is operated in the unlicensed spectrum and the paging configuration indicating the at least two PDCCH monitoring occasions is transmitted, the short message included in downlink control information (DCI) scrambled with a paging radio network temporary identifier (P-RNTI), and stopping monitoring a second PDCCH monitoring occasion in the PO in response to the indication.

20 Claims, 5 Drawing Sheets

(56) References Cited

U.S. PATENT DOCUMENTS

| | | |
|---|---|---|
| 2019/0159165 A1 | 5/2019 | Agiwal et al. |
| 2019/0297577 A1 | 9/2019 | Lin et al. |
| 2020/0077359 A1 | 3/2020 | Agiwal et al. |
| 2020/0100197 A1* | 3/2020 | Pan .................. H04W 72/0466 |
| 2020/0236647 A1 | 7/2020 | Agiwal et al. |
| 2021/0014011 A1* | 1/2021 | Xiong ............... H04W 74/0833 |
| 2021/0258930 A1* | 8/2021 | Nam .................... H04L 5/0048 |

OTHER PUBLICATIONS

Qualcomm Incorporated: "Report of [Offline 404] Stopping for Paging in NR-U", R2-1916372, 3GPP TSG-RAN WG2 Meeting #108, Reno, NV, USA, Nov. 18-22, 2019.

Qualcomm Incorporated: "Paging monitoring in NR-U", R2-1915011, 3GPP TSG-RAN WG2 Meeting #108, Reno, NV, USA, Nov. 18-22, 2019.

* cited by examiner

METHOD OF MONITORING PAGING OCCASIONS AND RELATED DEVICE

CROSS-REFERENCE TO RELATED APPLICATION(S)

The present disclosure claims the benefit of and priority to U.S. provisional Patent Application Ser. No. 62/941,974 filed on Nov. 29, 2019, entitled "Method and Apparatus for Paging with Short Message," (hereinafter referred to as "the '974 provisional"). The disclosure of the '974 provisional is hereby incorporated fully by reference into the present disclosure.

FIELD

The present disclosure is generally related to wireless communications, and, more specifically, to a method of monitoring paging occasions and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of monitoring paging occasions and a related device.

According to an aspect of the present disclosure, a method of monitoring paging occasions for a user equipment (UE) is provided. The method includes determining whether a paging configuration indicating at least two physical downlink control channel (PDCCH) monitoring occasions associated with a synchronization signal block (SSB) in a paging occasion (PO) is received from a base station (BS), determining whether the UE is operated in an unlicensed spectrum, receiving an indication in a short message in a first PDCCH monitoring occasion of the at least two PDCCH monitoring occasions when it is determined that the UE is operated in the unlicensed spectrum and the paging configuration indicating the at least two PDCCH monitoring occasions is received from the BS, the short message included in downlink control information (DCI) scrambled with a paging radio network temporary identifier (P-RNTI), and stopping monitoring a second PDCCH monitoring occasion in the PO in response to receiving the indication.

According to another aspect of the present disclosure, a UE for monitoring paging occasions is provided. The UE includes a processor configured to execute computer-executable instructions, and a non-transitory computer-readable medium, coupled to the processor and configured to store the computer-executable instructions, wherein the computer-executable instructions instruct the processor to perform the method.

According to another aspect of the present disclosure, a method of configuring paging occasions for a base station (BS) is provided. The method includes transmitting, to a user equipment (UE), a paging configuration indicating at least two physical downlink control channel (PDCCH) monitoring occasions associated with a synchronization signal block (SSB) in a paging occasion (PO), and transmitting, to the UE, an indication in a short message included in downlink control information (DCI) scrambled with a paging radio network temporary identifier (P-RNTI) in a first PDCCH monitoring occasion of the at least two PDCCH monitoring occasions.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
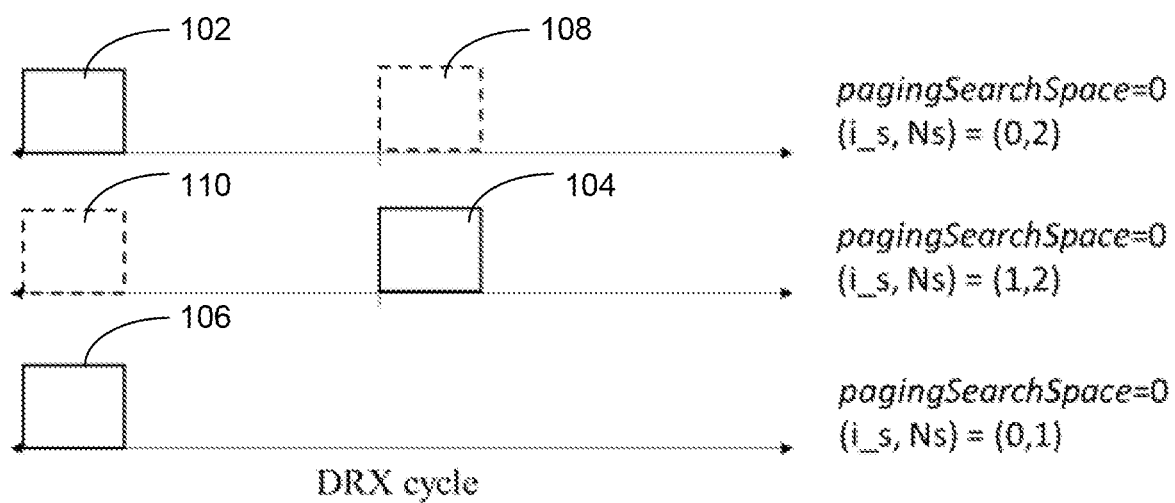
FIG. 1 is a schematic diagram illustrating locations of paging occasions (POs) in a Discontinuous Reception (DRX) cycle, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or an New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally uplink (UL) packet transmissions). The BS may communicate with one or more UEs in the radio communication system via the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided via an NR frame to support ProSe services or V2X services.

For a RAT deployed on an unlicensed spectrum, any devices (e.g., a UE, BS, and Access Point (AP)) may apply a Listen Before Talk (LBT) mechanism before accessing a channel. The devices may perform a Clear Channel Assessment (CCA) before transmitting on the unlicensed channel. If the LBT fails, the devices may not access the unlicensed channel at a determined time.

NR-based Unlicensed (NR-U) access design also applies the LBT mechanism. The deployment scenarios of NR-based unlicensed access may include:
  1. Carrier aggregation between licensed band NR (e.g., PCell) and NR-U (e.g., SCell), where NR-U SCell may have both downlink (DL) and uplink (UL), or DL-only;
  2. Dual connectivity between licensed band LTE (e.g., PCell) and NR-U (e.g., PSCell);
  3. Stand-alone NR-U;
  4. An NR cell with DL in an unlicensed band and UL in a licensed band; and
  5. Dual connectivity between licensed band NR (e.g., PCell) and NR-U (e.g., PSCell).

Paging allows the network to reach (specific) UEs in RRC_IDLE/RRC_INACTIVE state, and to transmit system information change and ETWS/CMAS indications to the UEs in RRC_IDLE state, RRC_INACTIVE state or RRC_CONNECTED state. Paging may further be used to notify the UEs in RRC_IDLE state, RRC_INACTIVE state or RRC_CONNECTED state to stop monitoring physical downlink control channel (PDCCH) monitoring occasions.

A UE in RRC_IDLE/RRC_INACTIVE state may receive the paging for mobile terminated data, which is initiated/managed by 5GC. The UE in RRC_IDLE/RRC_INACTIVE state may be configured with DRX by Non-Access Stratum (NAS), for receiving the paging from a CN (e.g., CN paging). Moreover, the UE in RRC_INACTIVE state may be configured with DRX, for receiving the paging initiated by NG-RAN (e.g., RAN paging).

The UE in RRC_IDLE/RRC_INACTIVE state may not monitor paging channel(s) continuously. For example, the UE in RRC_IDLE/RRC_INACITVE state may monitor paging channels during one or multiple Paging Occasions (PO) per DRX cycle. A PO is a set of PDCCH monitoring occasions and may consist of multiple time slots (e.g. subframes or OFDM symbols) where paging Downlink Control Information (DCI) may be sent. The PDCCH monitoring occasions for paging are determined by the UE according to "pagingSearchSpace" and firstPDCCH-MonitoringOccasionOfPO. A DRX cycle may be broadcast in system information (SI) for receiving the CN paging. The DRX cycle may be UE-specific, which is configured via a NAS signaling for CN paging or via a RRC signaling for RAN paging. If the UE is configured with multiple DRX cycles, the UE may apply the shortest DRX cycle among the configured DRX cycles. The UE in RRC_CONNECTED state may monitor the paging channels in any PO signaled in SI. In addition, for the UE in RRC_CONNECTED state configured with an active bandwidth part (BWP) with common search space to monitor paging channel(s), the UE may monitor a SI change indication in any paging occasion in a modification period.

FIG. 1 is a schematic diagram illustrating locations of POs in a DRX cycle, according to an implementation of the present disclosure. Examples of POs per DRX cycle for "pagingSearchSpace"=0 are illustrated in FIG. 1. The UE may calculate the potential locations of POs 102, 104, 106, 108 and 110 according to the paging frame (PF)/PO formula. For example, PO 102 and PO 108 are potential POs in case of Ns=2. When i_s is explicitly indicated, i.e., (i_s, Ns)=(0, 2), it indicates that the PO for (i_s, Ns)=(0, 2) is PO 102. For another example, PO 110 and 104 are potential POs in case of Ns=2. When i_s is explicitly indicated, i.e., (i_s, Ns)=(1, 2), it indicates that the PO for (i_s, Ns)=(0, 2) is PO 104. For another example, PO 106 is the only potential PO in case of (i_s, Ns)=(0, 1). In an example, only one PO (e.g., PO 102, PO 104, and PO 106) is present in each DRX cycle. Therefore, the UE may monitor the POs 102, 104 and 106 in each DRX cycle respectively. It is noted that there may be multiple POs in one DRX cycle, which is not limited herein. A PO associated with a PF may start in the PF or after the PF. i_s and Ns are parameters in the PF/PO formula.

The PF and PO are determined by the following equation (e.g., PF/PO formula):
System Frame Number (SFN) for the PF is determined by:

$$(SFN+PF\_offset) \bmod T = (T \operatorname{div} N)*(UE\_ID \bmod N)$$

Index (i_s), indicating the index of the PO is determined by:

$$i\_s = \operatorname{floor}(UE\_ID/N) \bmod Ns$$

T: DRX cycle of the UE (T is determined by the shortest of the UE specific DRX value(s), if configured by RRC and/or upper layers, and also by a default DRX value broadcast in system information. In RRC_IDLE state, if UE specific DRX is not configured by upper layers, the default value is applied).
N: number of total paging frames in T
Ns: number of paging occasions for a PF
PF_offset: offset used for PF determination
UE_ID: 5G-S-TMSI mod 1024

Parameters Ns, nAndPagingFrameOffset, and the length of default DRX Cycle are signaled in system information block type 1 (SIB1). The values of N and PF_offset are derived from the parameter nAndPagingFrameOffset. The parameter first-PDCCH-MonitoringOccasionOfPO is signaled in SIB1 for paging in an initial DL BWP by the gNB/cell to the UEs. For paging in a DL BWP other than the initial DL BWP, the parameter first-PDCCH-MonitoringOccasionOfPO is signaled in the corresponding BWP configuration by the gNB/cell to the UEs.

If the UE has no 5G System Architecture Evolution (SAE) Temporary Mobile Subscriber Identity (5G-S-TMSI), such as when the UE has not yet registered to a network, the UE may use a default identity (e.g., UE_ID=0) in the above-mentioned PF and i_s formulas.

5G-S-TMSI is a 48-bit long bit string. 5G-S-TMSI in the above-mentioned formula may be interpreted as a binary number where the leftmost bit represents the most significant bit.

Figure 2:
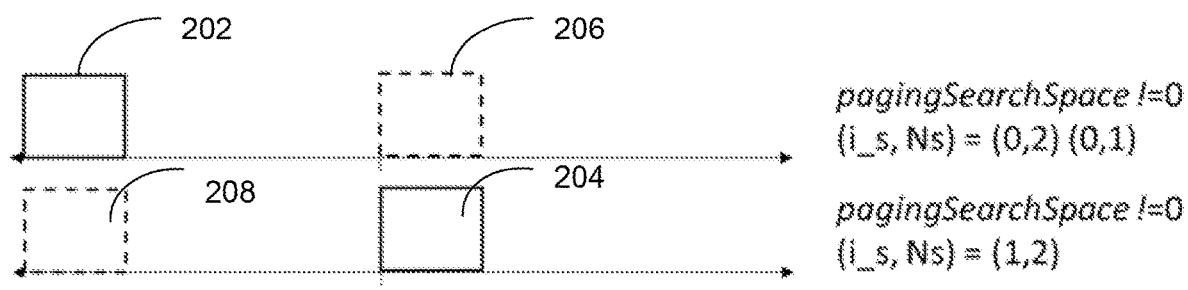
FIG. 2 is a schematic diagram illustrating locations of POs, according to an implementation of the present disclosure.

FIG. 2 is a schematic diagram illustrating locations of POs, according to an implementation of the present disclosure. When SearchSpaceId other than 0 is configured for "pagingSearchSpace", the UE may monitor the $(i\_s+1)^{th}$ PO, as illustrated in FIG. 2. For example, PO 202 is the first PO in case of (i_s, Ns)=(0, 2) or (0, 1). For another example, PO 204 is the second PO in case of (i_s, Ns)=(1, 2).

The UE may calculate the potential locations of POs 202, 204, 206, and 208 according to PF/PO formula. In an example, only one PO (e.g., PO 202 and PO 204) is present in each DRX cycle. Therefore, the UE may monitor the POs 202 and 204 in each DRX cycle respectively. It is noted that there may be multiple POs in one DRX cycle, which is not limited herein.

For paging, the Radio Link Control (RLC) entity of the UE may use Transparent Mode (TM) mode for transmission. Moreover, the UE may use Paging Control Channel (PCCH), a logical channel between the RLC entity and Medium Access Control (MAC) entity of the UE. PCCH is a downlink channel that transfers paging information, system information change notifications, an indication to stop monitoring paging or to stop monitoring PDCCH occasion(s) for paging, and/or indications of ongoing Public Warning Systems (PWS) (e.g., Earthquake and Tsunami Warning System (ETWS), Commercial Mobile Alert System (CMAS)).

In an example, a UE in RRC_IDLE/RRC_INACTIVE state may monitor ETWS/CMAS and/or the indication to stop monitoring paging or to stop monitoring PDCCH occasion(s) for paging in the corresponding PO. In another example, a UE in RRC_CONNECTED state may monitor ETWS/CMAS and/or the indication to stop monitoring paging or to stop monitoring PDCCH occasion(s) for paging in any PO. If the UE receives paging that indicates ETWS/CMAS, the UE may trigger the acquisition of system information without delaying until the next modification period. It is noted that PCCH may be mapped to a Paging Channel (PCH), a transport channel between the MAC and Physical Layer (PHY) of the UE.

Based on the NR paging mechanism, the UE monitors the paging channel(s) in one PO per DRX cycle. However, due to LBT failure on the unlicensed spectrum (e.g., NR-U), successful paging transmission opportunities may be reduced. The latency for a UE to successfully receive the paging may be increased if a gNB/cell cannot transmit the paging DCI in the paging occasion (e.g., due to LBT failure). In an example, a UE in RRC_IDLE/RRC_INACTIVE state may not receive the paging DCI successfully in the determined paging occasion(s) based on the PF and PO formula.

To solve the above-mentioned issues (e.g., due to LBT failure which causes reduced successful paging transmission opportunities), modifications to paging operations for the UE and BS are disclosed and may involve increased time-domain paging occasions or paging monitoring occasions. The modifications to paging operations may enable additional POs outside of DRS (Discovery Reference Signal).

NR-U DRS may refer to a contiguous burst including Channel State Information-Reference Signal (CSI-RS), Remaining System Information-Control Resource Set(s) (RMSI-CORESET(s)), Physical Downlink Shared Channel(s) (PDSCH(s)) carrying RMSI (RMSI-PDSCH(s)) and associated with Synchronization Signal/Physical Broadcast Channel (SS/PBCH) block(s) (SSB, Synchronization Signal Block), and SS/PBCH burst set.

For SS/PBCH block transmission in NR-U DRS, it has been identified as beneficial to include CSI-RS, RMSI-CORESET(s) and RMSI-PDSCH(s) in the same contiguous burst when transmission of CSI-RS/RMSI are configured. Optionally other SI (e.g., OSI) and paging can be transmitted in the same DRS if there are available resources.

A UE may determine the PO and PF per DRX cycle to monitor the paging channels based on the PF/PO formula. A BS may provide the required parameters (e.g., via a paging configuration) used in the PF/PO formula to the UE. Therefore, the UE may derive the location of PO and PF per DRX cycle. The UE may derive one PO in one PF per DRX cycle and monitor the paging channel(s) in one PO per DRX cycle. The UE may monitor the paging channel(s) in DRS based on the paging configuration for PF/PO formula calculation.

More paging transmission opportunities per DRX cycle may be beneficial for a UE to receive the paging message and/or paging DCI. Additional locations may be provided in a time domain by configuring an extended PO (i.e., a paging window) or configuring multiple POs to the UE. With additional paging transmission opportunities, POs may be transmitted in close time to or overlap with the reference signals, to reduce the UE power consumption.

Paging Monitoring Extension and Stopping Monitoring Paging

For NR-U, a UE may be configured with an additional number of paging monitoring occasions (e.g., PDCCH monitoring occasions) for a corresponding PO. In an example, when the UE detects a PDCCH transmission addressed to a paging radio network temporary identifier (P-RNTI) within the PO, the UE is not required to monitor the subsequent PDCCH monitoring occasions in this PO, so as to reduce power consumption.

Figure 3:
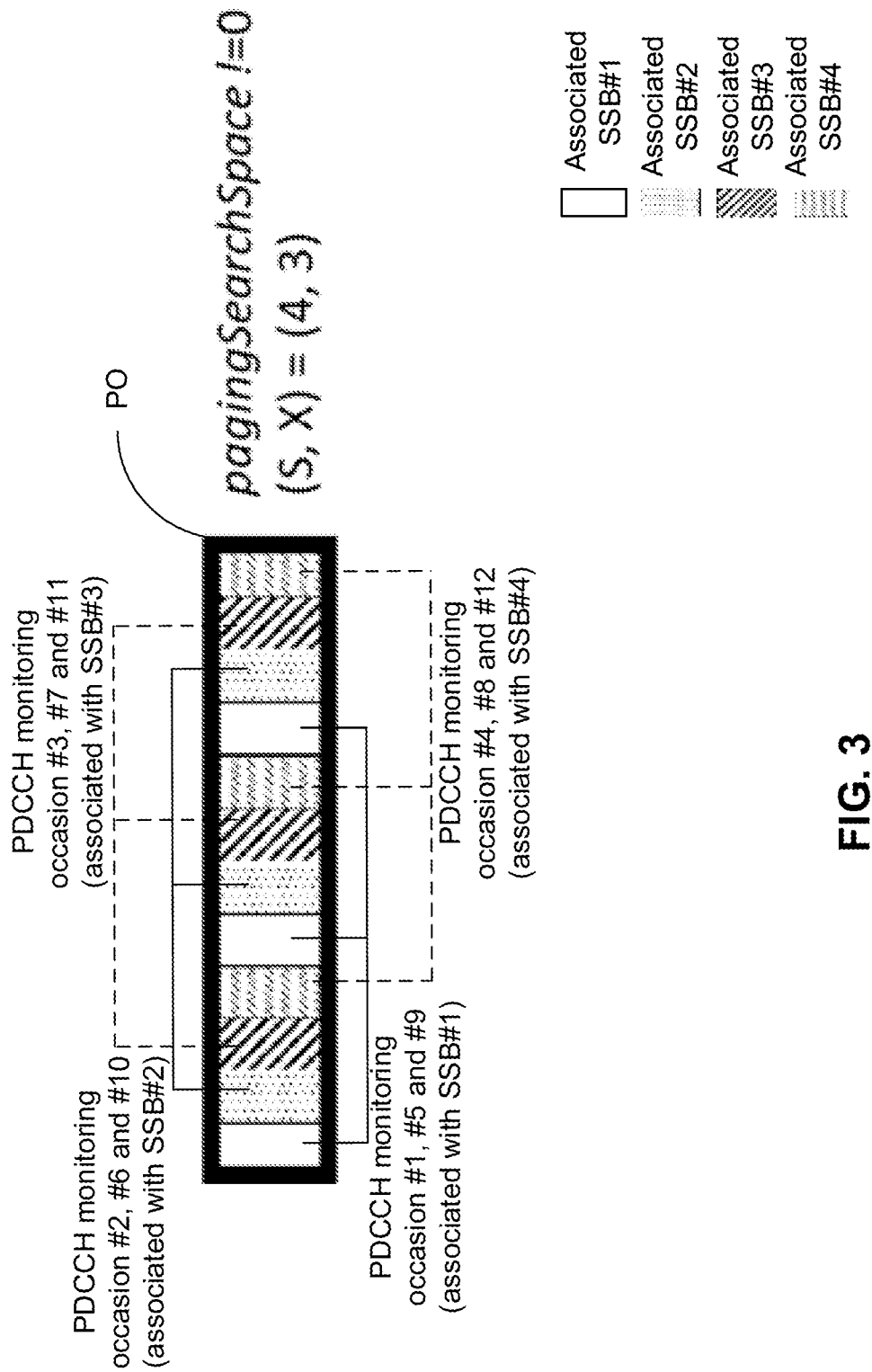
FIG. 3 is a schematic diagram illustrating an extension of a PO, according to an implementation of the present disclosure.

FIG. 3 is a schematic diagram illustrating an extension of a PO, according to an implementation of the present disclosure. Paging monitoring extension is achieved by extending PDCCH monitoring occasions for a PO. For example, a PO may consist of 'S×X' PDCCH monitoring occasions for paging, where 'S' is the number of actual transmitted SSBs determined according to ssb-PositionsInBurst in SIB1, and 'X' is the number of PDCCH monitoring occasions per SSB determined by additionalMonitoringOccasionOfPO if configured or is equal to '1' otherwise. As illustrated in FIG. 3, (S, X)=(4, 3) indicates that there are four associated SSBs (e.g., SSB #1-SSB #4) with which twelve PDCCH monitoring occasions are associated. For example, there are twelve PDCCH monitoring occasions (e.g., from PDCCH monitoring occasion #1 to PDCCH monitoring occasion #12), where PDCCH monitoring occasion #1, #5 and #9 are associated with SSB #1, PDCCH monitoring occasion #2, #6 and #10 are associated with SSB #2, PDCCH monitoring occasion #3, #7 and #11 are associated with SSB #3, and PDCCH monitoring occasion #4, #8 and #12 are associated with SSB #4.

In an example, in a case where a multiple-beam operation is applied, if a UE receives on PDCCH transmisson addressed to P-RNTI in a PDCCH monitoring occasion corresponding to an SSB in a PO, the UE is not required to monitor subsequent PDCCH monitoring occasions corresponding to that SSB in that PO.

In another example, in a case where the UE detects that a gNB/cell had access to the channel at the PDCCH monitoring occasion, the UE may stop monitoring paging for the PO even if the UE does not decode a P-RNTI. It is noted that, to stop monitoring paging or to stop monitoring PDCCH (monitoring) occasions (for paging) in a PO, a short message may be used to provide an indication, as illustrated in Table 2 (e.g., "pagingStoppingIndication" in Table 2). The indication is addressed to all the UEs that monitor a given PO (e.g., there is no per UE group indication). The indication is used for all the UEs to stop monitoring paging or to stop monitoring PDCCH monitoring occasions in the PO. If the short message is sent, the bit (corresponding to the "pagingStoppingIndication" in Table 2) may always be set to '1'.

Short Message Design

Short message may be carried in a paging DCI (e.g., the DCI format 1_0 addressed by P-RNTI). In the paging DCI, one information element of the bit field may be "short message" with 8 bits. The definition of each bit of the short message is illustrated Table 1 for a legacy UE (e.g., the 3GPP NR Rel-15 UE) and legacy gNB/cell (e.g., the 3GPP NR Rel-15 gNB/cell). A legacy gNB/cell may transmit the paging DCI to the legacy UEs. A legacy gNB/cell may not support transmitting multiple PDCCH transmissions addressed to P-RNTI in a PO for a UE, specifically not supporting additional PDCCH monitoring occasions.

In an example, a legacy gNB/cell may configure the UE with a paging configuration (e.g., additionalMonitoringOccasionOfPO) indicating a single PDCCH monitoring occasion associated with an SSB in a PO. In other examples, a legacy gNB/cell may not configure the UE with a paging configuration (e.g., additionalMonitoringOccasionOfPO). Therefore, the UE may determine that it does not support additional PDCCH monitoring occasions.

A legacy UE may not support monitoring multiple PDCCH transmissions addressed to P-RNTI in a PO, specifically not supporting additional PDCCH monitoring occasions.

TABLE 1

Short message format 1

| Bit | Short Message |
|---|---|
| 1 | systemInfoModification<br>If set to 1: indication of a broadcast control channel (BCCH) modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Definition 1: Not used in the 3GPP NR Rel-15 and shall be ignored by the 3GPP NR Rel-15 UE if received.<br>Definition 2: Not used by the gNB/UE that does not support additional PDCCH monitoring occasions for paging. The UEs not supporting additional PDCCH monitoring occasions for paging may ignore these bits if they receive these bits.<br>Definition 3: Not used by the gNB that does not broadcast parameters (e.g., additionalMonitoringOccasionOfPO) related to additional PDCCH monitoring occasions for paging in the system information. The UE that does not receive or is not configured with parameters (e.g., additionalMonitoringOccasionOfPO) related to additional PDCCH monitoring occasions for paging by the gNB, may ignore these bits if they receive these bits.<br>Note that: Definition 1, Definition 2 and/or Definition 3 may be applied for these bit field(s). |

A short message may be applied for an advanced UE and advanced gNBs/cell (e.g., 3GPP NR Rel-16 gNB/cell and UE). An advanced gNB/cell may support multiple PDCCH transmissions addressed to P-RNTI in a PO for a UE on the unlicensed spectrum. An advanced UE on the unlicensed spectrum may support monitoring multiple PDCCH transmissions addressed to P-RNTI in a PO (or in a DRX cycle, or a DRS).

An advanced gNB/cell may support multiple PDCCH transmissions addressed to P-RNTI in a PO for a UE, specifically supporting additional PDCCH monitoring occasions. An advanced gNB/cell may configure the UE with a paging configuration (e.g., additionalMonitoringOccasionOfPO) indicating at least two PDCCH monitoring occasions associated with an SSB in a PO. Therefore, the UE may determine that it supports additional PDCCH monitoring occasions.

An advanced UE may support monitoring multiple PDCCH transmissions addressed to P-RNTI in a PO, specifically supporting additional PDCCH monitoring occasions.

In one implementation, one bit in the short message may be used to indicate the UE to stop monitoring paging in a PO (or to stop monitoring PDCCH occasion(s) for paging in a PO), as illustrated in Table 2. If the short message is sent, the bit (corresponding to the "pagingStoppingIndication" in Table 2) may always be set to '1'.

TABLE 2

Short message format 2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | pagingStoppingIndication<br>Definition 1:<br>If set to 1: indication to stop monitoring paging in a PO (or to stop monitoring PDCCH occasion(s) for paging in a PO).<br>Definition 2:<br>If set to 1: indication to stop monitoring paging in other PO(s) (e.g., the next PO) in a DRX cycle.<br>Definition 3:<br>If set to 1: indication to stop monitoring paging associated with an SSB with which the UE receives the short message in the PDCCH monitoring occasions associated. The UE receives the short message via the SSB.<br>Note that: Definition 1, Definition 2 and/or Definition 3 may be applied for these bit field(s). |
| 4-8 | Not used and may be ignored by a UE if received. These bits may be regarded as the reserved bits. |

In one example, one bit in the short message may be used to indicate to the UE to stop monitoring paging in a DRX cycle. If the short message is sent, the bit (corresponding to "pagingStoppingIndication" in Table 2) is always set to '1'.

In another example, one bit in the short message may be used to indicate to the UE to stop monitoring paging in a DRS, if PDCCH transmission addressed to P-RNTI is configured in the DRS. If the short message is sent, the bit (corresponding to "pagingStoppingIndication" in Table 2) is always set to '1'.

UE Behavior to Stop Monitoring Paging

If multiple PDCCH transmissions addressed to P-RNTI are supported (e.g., by the advanced gNB/cell, by the advanced UEs, and/or on the unlicensed spectrum), the UE may stop monitoring paging in the PO, in the DRX cycle, or the DRS. The advanced UE may have different behaviors for stopping monitoring paging in different cases (e.g., whether multiple-beam operation is supported).

If 'S'=1, a single SSB or omni-antenna is used in the network. If 'S'>1, multiple-beam operation is used in the network. If 'X'=1, one PDCCH monitoring occasion for paging is associated with the corresponding beam (or SSB). If X>1, at least two PDCCH monitoring occasions are associated with the corresponding beam (or SSB).

Condition 1: if X>1, and the UE detects a PDCCH transmission addressed to P-RNTI within a PO.

This condition is applied when the network (e.g., gNB/cell) transmits a paging configuration indicating at least two PDCCH monitoring occasions associated with an SSB in a PO to the UE. In a case that at least two PDCCH monitoring occasions (e.g., a first PDCCH monitoring occasion and a second PDCCH occasion) for paging are associated with an SSB (e.g., X>1 and S>=1), and the UE detects a PDCCH transmission addressed to P-RNTI within the PO (e.g., the UE may receive an indication to stop monitoring paging, where the indication is in a short message in a paging DCI scrambled with a P-RNTI from the gNB/cell in the first PDCCH monitoring occasion), the UE is not required to monitor the subsequent PDCCH monitoring occasions (e.g., the second PDCCH monitoring occasion) in the PO.

In an example, the subsequent PDCCH monitoring occasions may correspond to any SSBs transmitted by the gNB/cell. In another example, the subsequent PDCCH monitoring occasions may refer to the PDCCH monitoring occasions corresponding to the SSB to which the UE detects a PDCCH transmission addressed to a P-RNTI corresponding.

In one implementation, if the UE is configured to monitor at least two POs per DRX cycle, in case that at least two PDCCH monitoring occasions are associated with the corresponding SSB, and if the UE detects a PDCCH transmission addressed to a P-RNTI within one of the configured POs, the UE may not be required to monitor the subsequent PDCCH monitoring occasions for any configured POs in the DRX cycle. In some implementations, the UE may not be required to monitor the subsequent PDCCH monitoring occasions corresponding to any SSBs in the DRX cycle. In some implementations, the UE may not be required to monitor the subsequent PDCCH monitoring occasions corresponding to the SSB to which the UE detects a PDCCH transmission addressed to P-RNTI corresponding, in the DRX cycle.

In some implementations, if the UE is configured to monitor at least one PO per DRS window, in case that at least two PDCCH monitoring occasions are associated with the corresponding SSB, and if the UE detects a PDCCH transmission addressed to a P-RNTI within one of the configured POs, the UE is not required to monitor the subsequent PDCCH monitoring occasions for any configured POs in the DRS window.

Condition 2: if X=1

Multiple-beam operation (e.g., "pagingSearchSpace" is not zero) may be supported in this condition. For example, a PO is a set of 'S' consecutive PDCCH monitoring occasions where 'S' is the number of actual transmitted SSBs determined according to ssb-PositionsInBurst in SIB. In one example, if X=1, "pagingSearchSpace" is configured to zero.

In one implementation, if the UE detects the PDCCH transmission addressed to the P-RNTI, the UE may receive only scheduling information for paging, according to a short message indicator in a paging DCI. The UE may further receive the paging message based on the scheduling information. In some implementations, the UE may stop monitoring the PDCCH monitoring occasions in this PO, which may imply that the UE may still monitor the PDCCH monitoring occasions in other PO(s) in a DRX cycle. In some implementations, if the UE receives the paging message including its UE identifier (ID) in a record list, the UE may stop monitoring the PDCCH monitoring occasions in this PO, which may imply that the UE may still monitor the PDCCH monitoring occasions in other PO(s) in a DRX cycle. In some implementations, if the UE does not receive the paging message including its UE ID in the record list, the UE may continue monitoring the PDCCH monitoring occasions in this PO. In yet another implementation, the UE may stop monitoring the PDCCH monitoring occasions in a DRX cycle, which may imply that the UE may stop monitoring any PDCCH monitoring occasions in any PO(s) (e.g., the next PO) in the DRX cycle.

In yet another implementation, if the UE receives the paging message including its UE ID in the record list, the UE may stop monitoring the PDCCH monitoring occasions in a DRX cycle, which may imply that the UE may stop monitoring any PDCCH monitoring occasions in any PO(s) (e.g., the next PO) in the DRX cycle. In yet another implementation, if the UE does not receive the paging message including its UE ID in the record list, the UE may continue monitoring the PDCCH monitoring occasions in any PO(s) (e.g., the next PO) in a DRX cycle. In yet another implementation, the UE may stop monitoring the PDCCH monitoring occasions associated with the corresponding SSB in which the UE has detected the PDCCH transmission addressed to the P-RNTI including only scheduling information for paging, which may imply that the UE may still monitor the PDCCH monitoring occasions associated with other SSB(s) in this PO or other PO(s) (e.g., the next PO), in a DRX cycle.

In yet another implementation, if the UE receives the paging message including its UE ID in the record list, the UE may stop monitoring the PDCCH occasions associated with the corresponding SSB in which the UE has detected the PDCCH transmission addressed to the P-RNTI including only scheduling information, which may imply that the UE may still monitor the PDCCH monitoring occasions associated with other SSB(s) associated with this PO or other PO(s) (e.g., the next PO), in a DRX cycle. In yet another implementation, if the UE does not receive the paging message including its UE ID in the record list, the UE may continue monitoring the PDCCH occasions associated with the corresponding SSB in which the UE has detected the PDCCH transmission addressed to the P-RNTI including only scheduling information.

In one implementation, if the UE detects the PDCCH transmission addressed to the P-RNTI, the UE may receive only short message, according to a short message indicator in the paging DCI. The indication (e.g., "pagingStoppingIndication" in Table 2) in the short message is set to '1'. In one implementation, the UE may stop monitoring any PDCCH monitoring occasions in a PO. In yet another implementation, the UE may stop monitoring any PDCCH monitoring occasions in other PO(s) in a DRX cycle. In yet another implementation, the UE may continue monitoring any PDCCH monitoring occasions in other PO(s) in a DRX cycle (e.g., the UE may monitor the PDCCH monitoring occasions associated with an SSB to which the UE does not detect the PDCCH transmission addressed to the P-RNTI associated). In yet another implementation, the UE may continue monitoring every PDCCH monitoring occasion in other PO(s) in a DRX cycle. In yet another implementation, the UE may stop monitoring the PDCCH monitoring occasions associated with the SSB to which the UE has detected the PDCCH transmission addressed to the P-RNTI associated, in this PO or other PO(s), in a DRX cycle.

In one implementation, if the UE detects the PDCCH transmission addressed to the P-RNTI, the UE may receive both short message and scheduling information for paging, according to a short message indicator in the paging DCI. The indication (e.g., "pagingStoppingIndication" in Table 2) in the short message is set to '1'. The UE may receive the paging message based on the scheduling information for paging. In one implementation, the UE may stop monitoring any PDCCH monitoring occasions in a PO. In yet another implementation, the UE may stop monitoring any PDCCH monitoring occasions in other PO(s) in a DRX cycle. In yet another implementation, the UE may continue monitoring any PDCCH monitoring occasions in other PO(s) in a DRX cycle. In yet another implementation, the UE may stop monitoring the PDCCH monitoring occasions associated with the SSB to which the UE has detected the PDCCH transmission addressed to the P-RNTI associated, in this PO or other PO(s), in a DRX cycle.

In one implementation, if the UE does not detect the PDCCH transmission addressed to the P-RNTI, the UE may continue monitoring the PDCCH monitoring occasions associated with a PO and/or associated with the next PO(s) in a DRX cycle.

In one implementation, if the UE does not detect (any) PDCCH transmission addressed to the P-RNTI, the UE may continue monitoring the PDCCH monitoring occasions associated with other transmitted SSBs associated with a PO. In some implementations, if the UE does not detect (any) PDCCH transmission addressed to the P-RNTI in a PO, the UE may continue monitoring the PDCCH monitoring occasions in the next PO in a DRX cycle.

Condition 3: if X>1, and the UE does not detect a PDCCH transmission addressed to P-RNTI within a PO In this condition, the UE may continue monitoring the PDCCH monitoring occasions for a PO. The UE may select at least one beam (or SSB) to detect the PDCCH transmission addressed to the P-RNTI for the reception of short message and/or the scheduling information for paging message. If the UE does not detect (any) PDCCH monitoring occasions addressed to the P-RNTI for the associated PO, the UE may continue monitoring the PDCCH monitoring occasions addressed to the P-RNTI associated with the next PO in a DRX cycle. The UE may select the beam (or SSB) with UE's implementation. In an example, the UE selects at least (or at most) one beam (or SSB) per PO to monitor the PDCCH monitoring occasions. In another example, the UE selects all beams (or SSBs) per PO to monitor the PDCCH monitoring occasions.

UE Behavior in Response to a Short Message, for Different Types of UEs

The short message including the "pagingStoppingIndication" (e.g., Table 2: short message format 2) may be transmitted by an advanced gNB/cell (e.g., 3GPP Rel-16 gNB/cell supporting licensed and unlicensed spectrum), or by an advanced gNB/cell supporting at least unlicensed spectrum.

The short message including the "pagingStoppingIndication" (e.g., Table 2: short message format 2) may be received by an advanced UE (e.g., 3GPP Rel-16 UE supporting licensed spectrum, 3GPP Rel-16 UE supporting unlicensed spectrum), or by a legacy UE (e.g., 3GPP Rel-15 UE supporting licensed spectrum).

In an example, an advanced UE, a UE operating on the unlicensed spectrum, a UE being configured with the indication to stop monitoring paging or stop monitoring PDCCH occasion(s) for paging, by the gNB/cell, a UE being configured with parameters related to additional PDCCH monitoring occasions (e.g., via paging configuration), or a UE being configured with additionalMonitoringOccasionOfPO by the gNB/cell, may determine the received short message as the short message format 2 and follow the corresponding UE behavior according to the short message (e.g., not monitoring subsequent PDCCH monitoring occasions in a PO). In another example, all advanced UEs (e.g., 3GPP Rel-16 UEs) may determine the received short message as the short message format 2 and follow the corresponding UE behavior according to the short message (e.g., not monitoring subsequent PDCCH monitoring occasions in a PO).

In one implementation, a UE may transmit UE capability information to a gNB/cell to indicate that the UE supports the stop paging monitoring function (or to indicate that the UE may behave based on the indication (e.g., "pagingStoppingIndication" in Table 2) in the short message) after the UE receives the UE capability inquiry message from the gNB/cell. A UE capability inquiry message may include information related to a UE capability request filter associated with a RAT. The RAT may be NR, E-UTRA NR-Dual Connectivity (EN-DC), or NR-U. The UE capability inquiry message may include information related to a frequency band list. The information related to a frequency band list may indicate an unlicensed spectrum. The information related to a UE capability request filter associated with a RAT may include an indicator for indicating the stop paging monitoring function.

The indicator may be an ENUMERATED {true} format. If the stop paging monitoring function is set to 'true', the UE may transmit UE capability information to the gNB/cell to indicate whether the UE supports the stop paging monitoring function (or to indicate that the UE may behave based on the indication (e.g., "pagingStoppingIndication" in Table 2) in the short message).

In response to the UE capability information, the gNB/cell may transmit the "pagingStoppingIndication" in the short message (e.g., Table 2: short message format 2) accordingly. In one implementation, when receiving the UE capability inquiry message including the indicator indicating the stop paging monitoring function (or report configuration of stop paging monitoring function), or when transmitting the UE capability information to indicate whether the UE supports the stop paging monitoring function (or to indicate that the UE may behave based on the indication (e.g., "pagingStoppingIndication" in Table 2) in the short message), the UE may not ignore the indication. The UE may behave based on the indication. The UE may determine the received short message as the short message format 2 and follow the corresponding UE behaviors (e.g., not monitoring subsequent PDCCH monitoring occasions in a PO). In yet another implementation, the UE may transmit UE capability information to the gNB/cell to indicate that the UE may not support the stop paging monitoring function anymore. When receiving the UE capability inquiry message including the indicator indicating the stop paging monitoring function, or when transmitting the UE capability information to indicate whether the UE supports the stop paging monitoring function (or to indicate that the UE may behave based on the indication (e.g., "pagingStoppingIndication" in Table 2) in the short message), the UE may determine the short message as the short message format 1 and follow the corresponding UE behaviors.

In one implementation, after transmitting the UE capability information to the gNB/cell, the UE may receive an RRC message (e.g., RRC Reconfiguration message) from the gNB/cell, where the RRC message includes a configuration including an indication to stop monitoring paging or stop monitoring PDCCH occasion(s) for paging, a short message format indicator (e.g., short message format 1, or short message format 2), and/or a single indicator for the UE capability information. The UE may behave according to the short message format indicator, the single indicator for the UE capability information and/or the configuration including an indication to stop monitoring paging or stop monitoring PDCCH occasion(s) for paging after receiving the RRC message.

For example, if the configuration including an indication to stop monitoring paging or stop monitoring PDCCH occasion(s) for paging is configured and the single indicator for UE capability information does not acknowledge the UE's not supporting the stop paging monitoring function, and/or if the single indicator for UE capability information acknowledges the UE's support of the stop paging monitoring function, and/or if the short message format is indicated to be short message format 2, the UE may not ignore the indication (e.g., "pagingStoppingIndication" in Table 2) and may behave according to the indication (e.g., "pagingStoppingIndication" in Table 2). The UE may determine the received short message as the short message format 2 and follow the corresponding UE behaviors (e.g., not monitoring subsequent PDCCH monitoring occasions in a PO).

For another example, if the configuration including an indication to stop monitoring paging or stop monitoring PDCCH occasion(s) for paging is not configured by the RRC message and the short message format is indicated to be short message format 1, if the single indicator for UE capability information does not acknowledge the UE's support of the stop paging monitoring function, and/or if the single indicator for UE capability information acknowledges the UE's no support of the stop paging monitoring function, the UE may ignore the indication. The UE may not behave based on the indication. The UE may determine the received short message as the short message format 1 and follow the corresponding UE behaviors.

In one implementation, the UE may transmit UE assistance information to the gNB/cell to indicate that the UE supports the stop paging monitoring function (or to indicate that the UE may behave based on the indication in the short message). The UE may transmit the UE assistance information in response to the reception of RRC Reconfiguration message from the gNB/cell. The UE assistance information may include an indicator for indicating the stop paging monitoring function.

The indicator may be an ENUMERATED {true} format. If the UE receives the RRC Reconfiguration message including a configuration of stop paging monitoring function, which is set to 'true', the UE may transmit the UE assistance information to the gNB/cell to indicate whether the UE supports the stop paging monitoring function (or to indicate that the UE may behave based on the indication in the short message). In another implementation, in response to the UE assistance information, the gNB/cell may transmit the "pagingStoppingIndication" in the short message (e.g., Table 2: short message format 2). In one implementation, when transmitting the UE assistance information to indicate whether the UE supports the stop paging monitoring function (or to indicate that the UE may behave based on the indication in the short message), the UE may not ignore the indication. The UE may behave based on the indication. The UE may determine the received short message as the short message format 2 and follow the corresponding UE behaviors (e.g., not monitoring subsequent PDCCH monitoring occasions in a PO). In yet another implementation, the UE may transmit UE assistance information to the gNB/cell to indicate that the UE may not support the stop paging monitoring function anymore. When transmitting the UE assistance information to indicate whether the UE supports the stop paging monitoring function (or to indicate that the UE may behave based on the indication in the short message), the UE may determine the short message as the short message format 1 and follow the corresponding UE behaviors.

In one implementation, after transmitting the UE assistance information to the gNB/cell, the UE may receive an RRC message (e.g., RRC Reconfiguration message) from the gNB/cell, where the RRC message includes the configuration including an indication to stop monitoring paging or stop monitoring PDCCH occasion(s) for paging, short message format indicator (e.g., short message format 1, or short message format 2), and/or a single indicator for the UE assistance information. The UE may behave based on the short message format indicator, a single indicator for the UE assistance information and/or the configuration including an indication to stop monitoring paging or stop monitoring PDCCH occasion(s) for paging after receiving the RRC message. For example, if the indication is configured, and/or if the short message format is indicated to be short message format 2, if the single indicator for UE assistance information does not acknowledge the UE's not supporting the stop paging monitoring function, and/or if the single indicator for UE assistance information acknowledges the UE's support of stop paging monitoring function, the UE may not ignore the indication, and may behave based on the indication. The UE may determine the received short message as the short message format 2 and follow the corresponding UE behaviors (e.g., not monitoring subsequent PDCCH monitoring occasions in a PO).

In another example, if the configuration including an indication to stop monitoring paging or stop monitoring PDCCH occasion(s) for paging is not configured by the RRC message and the short message format is indicated to be short message format 1, if the single indicator for UE assistance information does not acknowledge the UE's support of stop paging monitoring function, and/or if the single indicator for UE assistance information acknowledges the UE's no support of stop paging monitoring function, the UE may ignore the indication. The UE may not behave based on the indication. The UE may determine the received short message as the short message format 1 and follow the corresponding UE behaviors.

In one implementation, if the UE is configured with the configuration including an indication to stop monitoring paging or stop monitoring PDCCH occasion(s) for paging by receiving the configuration including an indication to stop monitoring paging or stop monitoring PDCCH occasion(s) for paging (or by receiving parameters related to additional PDCCH monitoring occasions (e.g., additional-MonitoringOccasionOfPO)) from an RRC message from the gNB/cell, the UE may behave based on the indication bit in the short message. The UE may determine the received short message as the short message format 2 and follow the corresponding UE behaviors (e.g., not monitoring subsequent PDCCH monitoring occasions in a PO). In another implementation, if the UE is configured with a deactivation or removal of the configuration including an indication to stop monitoring paging or stop monitoring PDCCH occasion(s) for paging (or parameters related to additional PDCCH monitoring occasions for paging) by receiving the deactivation or removal of the configuration including an indication to stop monitoring paging or stop monitoring PDCCH occasion(s) for paging (or parameters related to additional PDCCH monitoring occasions for paging) from an RRC message from the gNB/cell, the UE may ignore the indication bit in the short message. The UE may determine the received short message as the short message format 1 and follow the corresponding UE behaviors. In one implementation, if the UE is not configured with the configuration including an indication to stop monitoring paging or stop monitoring PDCCH occasion(s) for paging (e.g., not receiving the configuration including an indication to stop monitoring paging or stop monitoring PDCCH occasion(s) for paging, not receiving parameters related to additional PDCCH monitoring occasions, not receiving a paging configuration (e.g., additionalMonitoringOccasionOfPO), or receiving a paging configuration indicating one PDCCH monitoring occasion associated with an SSB) from an RRC message from the gNB/cell, the UE may ignore the indication bit (e.g., the 3rd bit as the indication bit in the short message format 2) in the short message. The UE may determine the received short message as the short message format 1 and follow the corresponding UE behaviors.

It is noted that a UE in RRC_CONNECTED state may apply the corresponding behaviors for the corresponding short message formats based on the RRC Reconfiguration message with configuration with sync (e.g., reconfiguration-withsync Information Element (IE)) or the RRC Connection Reconfiguration message with mobility control information (e.g., mobilitycontrolinfo IE) when the UE hands over to a target gNB/cell, configured by the gNB/cell which transmits the RRC Reconfiguration message with configuration with sync or the RRC Connection Reconfiguration message with mobility control information to the UE. Once the UE receives the "updated" configuration related to the indication (e.g., new RRC message (or system information) including/excluding the configuration including an indication to stop monitoring paging or stop monitoring PDCCH occasion(s) for paging, new RRC message (or system information) including/excluding parameters related to additional PDCCH monitoring occasions from the target cell, the UE may replace the configured configuration including an indication to stop monitoring paging or stop monitoring PDCCH occasion(s) for paging with the "updated" configuration including a configuration to stop monitoring paging or stop monitoring PDCCH occasion(s) for paging. The UE may receive the "updated" configuration after the UE performs the handover to the target cell successfully (e.g., through handover procedure or conditional handover procedure).

In one implementation, if the UE is configured with a configuration including an indication to stop monitoring paging or stop monitoring PDCCH occasion(s) for paging by receiving the configuration including an indication to stop monitoring paging or stop monitoring PDCCH occasion(s) for paging (or by receiving parameters related to additional PDCCH monitoring occasions) from a RRC Release message with a suspend configuration from the gNB/cell, the UE may behave based on the indication bit in the short message after the UE in RRC_CONNECTED state transitions to RRC_INACTIVE state. The UE in RRC_INACTIVE state may determine the received short message as the short message format 2 and follow the corresponding UE behaviors (e.g., not monitoring subsequent PDCCH monitoring occasions in a PO). In another implementation, if the UE is not configured with the configuration including an indication to stop monitoring paging or stop monitoring PDCCH occasion(s) for paging (e.g., not receiving the configuration including an indication to stop monitoring paging or stop monitoring PDCCH occasion(s) for paging, or not receiving parameters related to additional PDCCH monitoring occasions) from a RRC Release message with a suspend configuration from the gNB/cell, the UE may ignore the indication bit in the short message after the UE in RRC_CONNECTED state transitions to RRC_INACTIVE state. The UE in RRC_INACTIVE state may determine the received short message as the short message format 1 and follow the corresponding UE behaviors.

It is noted that the UE in RRC_INACTIVE state may apply the corresponding behaviors for the corresponding short message formats based on the RRC Release message with the suspend configuration when the UE moves in the RAN notification area (RNA), configured by the gNB/cell that transmits the RRC Release message with the suspend configuration to the UE. Once the UE receives the "updated" configuration related to the indication (e.g., new RRC message (or system information) including/excluding the configuration including an indication to stop monitoring paging or stop monitoring PDCCH occasion(s) for paging, new RRC message (or system information) including/excluding parameters related to additional PDCCH monitoring occasions from a newly camped cell or a serving cell), the UE may replace the configured configuration including an indication to stop monitoring paging or stop monitoring PDCCH occasion(s) for paging with the "updated" configuration including an indication to stop monitoring paging or stop monitoring PDCCH occasion(s) for paging. The UE may receive the "updated" configuration when the UE performs periodic RNA update (RNAU), reselects a cell not belonging to the RNA, or enters RRC_CONNECTED state.

In yet another implementation, if the UE is configured the configuration including an indication to stop monitoring paging or stop monitoring PDCCH occasion(s) for paging by receiving the configuration including an indication to stop monitoring paging or stop monitoring PDCCH occasion(s) for paging (or by receiving parameters related to additional PDCCH monitoring occasions) from a RRC Release message without a suspend configuration from the gNB/cell, the UE may behave based on the indication bit in the short message after the UE in RRC_CONNECTED state transitions to RRC_IDLE state. The UE in RRC_IDLE state may determine the received short message as the short message format 2 and follow the corresponding UE behaviors (e.g., not monitoring subsequent PDCCH monitoring occasions in a PO). In yet another implementation, if the UE is not configured with a configuration including an indication to stop monitoring paging or stop monitoring PDCCH occasion(s) for paging (e.g., not receiving the configuration including an indication to stop monitoring paging or stop monitoring PDCCH occasion(s) for paging, or not receiving parameters related to additional PDCCH monitoring occasions) from a RRC Release message without a suspend configuration from the gNB/cell, the UE may ignore the indication bit (e.g., the 3rd bit as the indication bit in the short message format 2) in the short message after the UE in RRC_CONNECTED state transitions to RRC_IDLE state. The UE in RRC_IDLE state may determine the received short message as the short message format 1 and follow the corresponding UE behaviors.

It is noted that the RRC_IDLE UE may apply the corresponding behaviors for the corresponding short message formats based on the RRC Release message without a suspend configuration even when the UE reselects another cell. Once the UE receives the "updated" configuration related to the indication (e.g., new RRC message (or system information) including/excluding the configuration including an indication to stop monitoring paging or stop monitoring PDCCH occasion(s) for paging, new RRC message (or system information) including/excluding parameters related to additional PDCCH monitoring occasions from a newly camped cell or a serving cell, the UE may replace the configured configuration including an indication to stop monitoring paging or stop monitoring PDCCH occasion(s) for paging with the "updated" configuration including an indication to stop monitoring paging or stop monitoring PDCCH occasion(s) for paging. The UE may receive the "updated" configuration when the UE performs the cell reselection procedure or enters RRC_CONNECTED state.

In one implementation, if the UE is configured with a configuration including an indication to stop monitoring paging or stop monitoring PDCCH occasion(s) for paging by receiving the configuration including an indication to stop monitoring paging or stop monitoring PDCCH occasion(s) for paging (or by receiving parameters related to additional PDCCH monitoring occasions) from the system information from the gNB/cell, the UE may behave based on the indication bit in the short message. The UE may determine the received short message as the short message format 2 and follow the corresponding UE behaviors (e.g., not monitoring subsequent PDCCH monitoring occasions in a PO). In another implementation, if the UE is configured with a deactivation or removal of the configuration including an indication to stop monitoring paging or stop monitoring PDCCH occasion(s) for paging (or parameters related to additional PDCCH monitoring occasions) by receiving the deactivation or removal of the configuration including an indication to stop monitoring paging or stop monitoring PDCCH occasion(s) for paging (or parameters related to additional PDCCH monitoring occasions for paging) from the system information from the gNB/cell, the UE may ignore the indication bit in the short message. The UE may determine the received short message as the short message format 1 and follow the corresponding UE behaviors. In another implementation, if the UE is not configured with the configuration including an indication to stop monitoring paging or stop monitoring PDCCH occasion(s) for paging (e.g., not receiving the configuration including an indication to stop monitoring paging or stop monitoring PDCCH occasion(s) for paging, not receiving parameters related to additional PDCCH monitoring occasions for paging) from the system information from the gNB/cell, the UE may ignore the indication bit in the short message. The UE may determine the received short message as the short message format 1 and follow the corresponding UE behaviors. If the UE is configured with a stop paging monitoring function by an RRC message, the UE may ignore the configuration of the stop paging monitoring function received from the system information. If the UE is configured with the configuration including an indication to stop monitoring paging or stop monitoring PDCCH occasion(s) for paging by an RRC message, the UE may ignore the configuration including an indication to stop monitoring paging or stop monitoring PDCCH occasion(s) for paging received from the system information.

In one implementation, if an advanced UE operating on the licensed spectrum (e.g., 3GPP Rel-16 and beyond NR UE) or a legacy UE operating on the licensed spectrum (e.g., 3GPP Rel-15 NR UE) receives the short message with the indication bit set to '1', the UE may ignore the indication. The UE may determine the indication bit as a reserved bit.

In one implementation, if an advanced UE operating on the licensed spectrum (e.g., 3GPP Rel-16 and beyond NR UE) or the advanced UE operating on the unlicensed spectrum (e.g., 3GPP Rel-16 and beyond NR-U UE) receive the short message with the indication bit set to '1', the UE may not ignore the indication bit. The UE may stop monitoring PDCCH monitoring occasions for paging based on the short message including the indication. For example, the UE may stop monitoring the subsequent PDCCH monitoring occasions in a PO. The UE may stop monitoring the subsequent PDCCH monitoring occasions in any PO (e.g., the next PO) in a DRX cycle. The UE may stop monitoring the subsequent PDCCH monitoring occasions associated with an SSB with which the UE receives the short message in the PDCCH monitoring occasions associated, in a PO (or in the following PO(s)) in a DRX cycle. The UE may receive the short message via the SSB.

Figure 4:
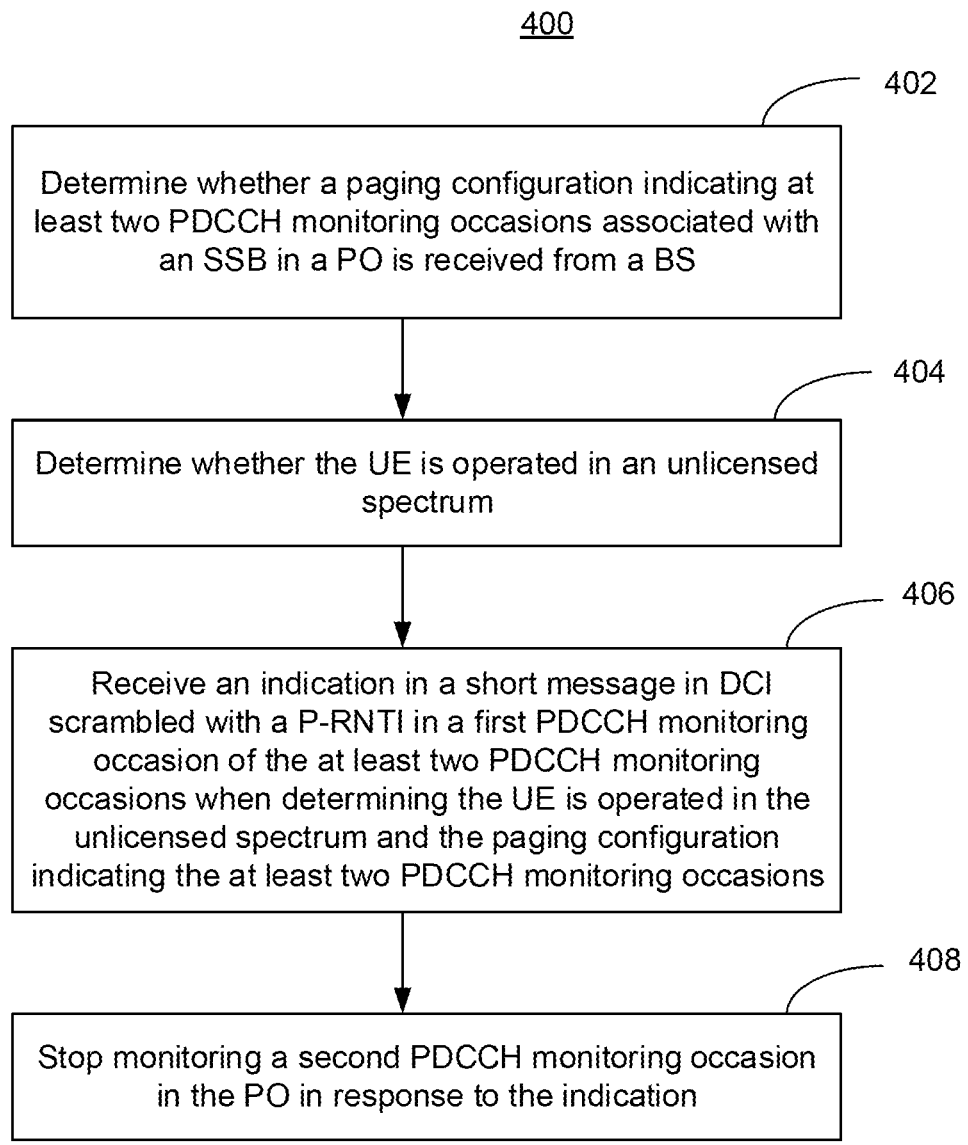
FIG. 4 is a flowchart illustrating a method for monitoring a PO, according to an implementation of the present disclosure.

FIG. 4 is a flowchart illustrating a method 400 for monitoring a PO, according to an implementation of the present disclosure. In action 402, the UE may determine whether a paging configuration indicating at least two PDCCH monitoring occasions associated with an SSB in a PO is received from a BS. In action 404, the UE may determine whether the UE is operated in an unlicensed spectrum. In action 406, the UE may receive an indication in a short message in DCI scrambled with a P-RNTI in a first PDCCH monitoring occasion of the at least two PDCCH monitoring occasions when determining that the UE is operated in the unlicensed spectrum and the paging configuration indicating the at least two PDCCH monitoring occasions is received from the BS. In action 408, the UE may stop monitoring a second PDCCH monitoring occasion in the PO in response to receiving the indication.

Specifically, the UE receives the short message in the first PDCCH monitoring occasion of the at least two PDCCH monitoring occasions, and the short message is included in the DCI scrambled with a P-RNTI. That is, the DCI scrambled with the P-RNTI is transmitted by the BS to the UE within the first PDCCH monitoring occasion.

In one example, the indication (e.g., "pagingStoppingIndication" of short message format 2 of Table 2) is set to a first value (e.g., '1') to indicate the UE to stop monitoring (e.g., by ignoring or not monitoring) a second PDCCH monitoring occasion in the PO.

In one example, the paging configuration is transmitted from the network to the UE via system information block type 1 (SIB1).

In one example, the short message is transmitted in a DCI format 1_0, and the indication is included in a third bit of the short message (as shown in Table 2).

In one implementation, the UE may further determine whether the UE is operated in a licensed spectrum, and may ignore the indication after determining that the UE is operated in the licensed spectrum or after determining that the UE is not operated in the unlicensed spectrum.

In some implementations, the UE may ignore the indication after determining that a second paging configuration received from the BS indicates one PDCCH monitoring occasion associated with an SSB or when no paging configuration is received from the BS.

The terms "NW", "network" "cell," "base station," "gNB," "eNB," and "ng-eNB" may be utilized interchangeably in the present disclosure.

The terms NW, RAN, cell, camped cell, serving cell, base station, gNB, eNB and ng-eNB may be used interchangeably. In some implementations, some of these items may refer to the same network entity.

The above-mentioned mechanism may be applied to any RAT. The RAT may be (but not limited to) NR, NR-U, LTE, E-UTRA connected to 5GC, LTE connected to 5GC, E-UTRA connected to EPC, and LTE connected to EPC. The above-mentioned mechanism may be applied for UEs in public networks, or in a private network (e.g., non-public network (NPN), standalone NPN (SNPN), public network integrated NPN (PNI-NPN)). The above-mentioned mechanism may be used for licensed frequency and/or unlicensed frequency.

System information (SI) may refer to Master Information Block (MIB), SIB1, and other SI. Minimum SI may include MIB and SIB1. Other SI may refer to SIB3, SIB4, SIB5, and other SIB(s).

Dedicated signaling may refer to (but not limited to) RRC message(s). For example, RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration Complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message.

The terms paging, paging channel, PDCCH monitoring occasions for paging, paging message, and paging occasion may be used interchangeably.

Paging DCI(s) may be carried by PDCCH in a CORESET.

Paging PDCCH(s) may include the DCI format 1_0 with Cyclic Redundancy Check (CRC) scrambled by P-RNTI.

PDSCH may carry the paging message.

The UE in RRC_CONNECTED state, RRC_INACTIVE state, and RRC_IDLE state may apply the above-mentioned implementations.

In some implementations, if the UE monitors the paging channel(s), the UE may further receive the paging (e.g., paging DCI(s), paging message(s)) in the paging occasion(s).

In some implementations, if the UE monitors the paging channel(s), the UE may further decode the paging (e.g., paging DCI(s), paging message(s)) in the paging occasion(s).

Paging DCI may be DCI with CRC scrambled by P-RNTI or by a common RNTI, which indicates the information related to paging. The information related to paging may be the time/frequency resource to for the UE to receive paging message(s). The information related to paging may be the ETWS/CMAS notification and/or system information change.

It is noted that identities (not limited to P-RNTI, C-RNTI) may be used in the above-mentioned implementations.

DRS window length may be 5 ms. DRX cycle may be 32, 64, 128, 256 radio frames.

A UE in RRC_CONNECTED state may be configured with an active BWP with common search space configured to monitor system information or paging.

The PDCCH for paging which the UE successfully decodes may indicate the paging information including the UE identity or without the UE identity.

In some implementations, the UE may receive the paging (e.g., paging DCI, paging message) in the initial BWP, and/or active BWP.

The above-mentioned mechanism may be applied for the PCell and the UE. In some implementations, the above-mentioned mechanism may be applied for the PSCell and the UE. The above-mentioned short message and/or paging DCI may be transmitted by the PSCell (or secondary node) to the UE. The UE may monitor the PDCCH monitoring occasions for paging configured by the PSCell (or secondary node).

Figure 5:
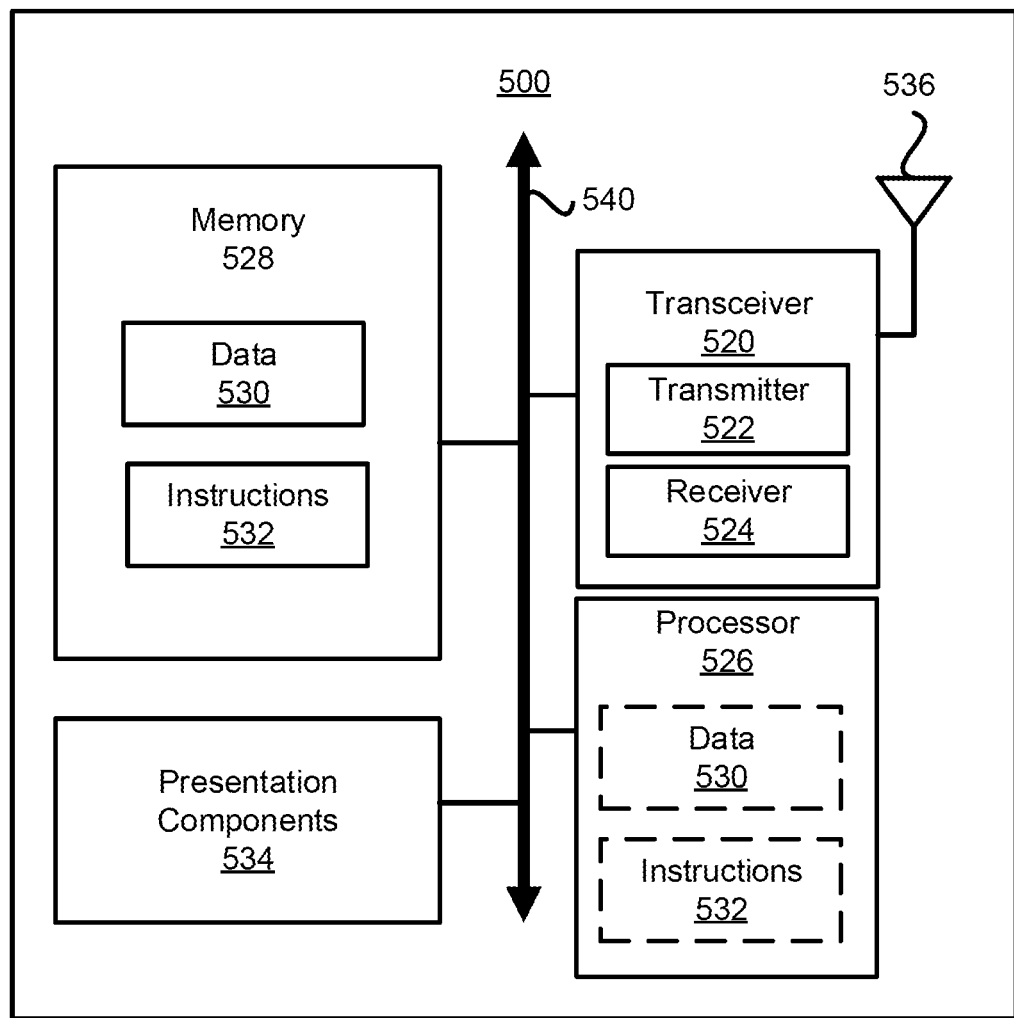
FIG. 5 is a block diagram illustrating a node for wireless communication, according to an implementation of the present disclosure.

FIG. 5 is a block diagram illustrating a node 500 for wireless communication, according to an implementation of the present disclosure.

As illustrated in FIG. 5, the node 500 may include a transceiver 520, a processor 526, a memory 528, one or more presentation components 534, and at least one antenna 536. The node 500 may also include a Radio Frequency (RF) spectrum band module, a BS communications module, a network communications module, and a system communications management module, input/output (I/O) ports, I/O components, and a power supply (not illustrated in FIG. 5). Each of these components may be in communication with each other, directly or indirectly, over one or more buses 540. The node 500 may be a UE or a BS that performs various disclosed functions illustrated in FIG. 4.

The transceiver 520 may include a transmitter 522 (with transmitting circuitry) and a receiver 524 (with receiving circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any media that can be accessed by the node 500 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 528 may include computer-storage media in the form of volatile and/or non-volatile memory. The memory 528 may be removable, non-removable, or a combination thereof. For example, the memory 528 may include solid-state memory, hard drives, optical-disc drives, etc. As illustrated in FIG. 5, the memory 528 may store computer-readable and/or computer-executable instructions 532 (e.g., software codes) that are configured to, when executed, cause the processor 526 (e.g., processing circuitry) to perform various disclosed functions. Alternatively, the instructions 532 may not be directly executable by the processor 526 but may be configured to cause the node 500 (e.g., when compiled and executed) to perform various disclosed functions.

The processor 526 may include an intelligent hardware device, a central processing unit (CPU), a microcontroller, an ASIC, etc. The processor 526 may include memory. The processor 526 may process the data 530 and the instructions 532 received from the memory 528, and information through the transceiver 520, the baseband communications module, and/or the network communications module. The processor 526 may also process information to be sent to the transceiver 520 for transmission via the antenna 536, to the network communications module for transmission to a CN.

One or more presentation components 534 may present data to a person or other devices. Presentation components 534 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of monitoring paging occasions for a user equipment (UE), the method comprising:
   determining whether a paging configuration indicating at least two physical downlink control channel (PDCCH) monitoring occasions associated with a synchronization signal block (SSB) in a paging occasion (PO) is received from a base station (BS);
   determining whether the UE is operated in an unlicensed spectrum;
   receiving an indication in a short message in a first PDCCH monitoring occasion of the at least two PDCCH monitoring occasions when it is determined that the UE is operated in the unlicensed spectrum and the paging configuration indicating the at least two PDCCH monitoring occasions is received from the BS, the short message included in downlink control information (DCI) scrambled with a paging radio network temporary identifier (P-RNTI); and
   stopping monitoring a second PDCCH monitoring occasion in the PO in response to receiving the indication.

2. The method of claim 1, wherein the indication is set to a first value to indicate to the UE to stop monitoring the second PDCCH monitoring occasion in the PO.

3. The method of claim 1, wherein the paging configuration is received by the UE via system information block type 1 (SIB1).

4. The method of claim 1, further comprising:
   determining whether the UE is operated in a licensed spectrum; and
   ignoring the indication after determining that the UE is operated in the licensed spectrum or after determining that the UE is not operated in the unlicensed spectrum.

5. The method of claim 1, further comprising ignoring the indication after determining that a second paging configuration received from the BS indicates one PDCCH monitoring occasion associated with the SSB or when no paging configuration is received from the BS.

6. The method of claim 1, wherein the short message is received in a DCI format 1_0, and the indication is included in a third bit of the short message.

7. A user equipment (UE) for monitoring paging occasions, the UE comprising:
   a processor configured to execute computer-executable instructions; and
   a non-transitory computer-readable medium coupled to the processor and configured to store the computer-executable instructions, which when executed by the processor, cause the UE to:
      determine whether a paging configuration indicating at least two physical downlink control channel (PDCCH) monitoring occasions associated with a synchronization signal block (SSB) in a paging occasion (PO) is received from a base station (BS);
      determine whether the UE is operated in an unlicensed spectrum;
      receive an indication in a short message in a first PDCCH monitoring occasion of the at least two PDCCH monitoring occasions when it is determined that the UE is operated in the unlicensed spectrum and the paging configuration indicating the at least two PDCCH monitoring occasions is received from the BS, the short message included in downlink control information (DCI) scrambled with a paging radio network temporary identifier (P-RNTI); and
      stop monitoring a second PDCCH monitoring occasion in the PO in response to receiving the indication.

8. The UE of claim 7, wherein the indication is set to a first value to indicate to the UE to stop monitoring the second PDCCH monitoring occasion in the PO.

9. The UE of claim 7, wherein the paging configuration is received by the UE via system information block type 1 (SIB1).

10. The UE of claim 7, wherein the computer-executable instructions when executed by the processor further cause the UE to:

determine whether the UE is operated in a licensed spectrum; and ignore the indication after determining that the UE is operated in the licensed spectrum or after determining that the UE is not operated in the unlicensed spectrum.

11. The UE of claim 7, wherein the computer-executable instructions when executed by the processor further cause the UE to:

ignore the indication after determining that a second paging configuration received from the BS indicates one PDCCH monitoring occasion associated with the SSB or when no paging configuration is received from the BS.

12. The UE of claim 7, wherein the short message is received in a DCI format 1_0, and the indication is included in a third bit of the short message.

13. A method of configuring paging occasions for a base station (BS), the method comprising:

transmitting, to a user equipment (UE), a paging configuration indicating at least two physical downlink control channel (PDCCH) monitoring occasions associated with a synchronization signal block (SSB) in a paging occasion (PO); and transmitting, to the UE, an indication in a short message included in downlink control information (DCI) scrambled with a paging radio network temporary identifier (P-RNTI) in a first PDCCH monitoring occasion of the at least two PDCCH monitoring occasions.

14. The method of claim 13, wherein the indication is set to a first value to indicate to the UE to stop monitoring a second PDCCH monitoring occasion in the PO.

15. The method of claim 13, wherein the paging configuration is transmitted by the BS via system information block type 1 (SIB1).

16. The method of claim 13, wherein the short message is transmitted in a DCI format 1_0, and the indication is included in a third bit of the short message.

17. A base station (BS) for configuring paging occasions, the BS comprising:

a processor configured to execute computer-executable instructions; and a non-transitory computer-readable medium coupled to the processor and configured to store the computer-executable instructions, which when executed by the processor, cause the UE to perform the method according to claim 13.

18. The BS of claim 17, wherein the indication is set to a first value to indicate to the UE to stop monitoring a second PDCCH monitoring occasion in the PO.

19. The BS of claim 17, wherein the paging configuration is transmitted by the BS via system information block type 1 (SIB1).

20. The BS of claim 17, wherein the short message is transmitted in a DCI format 1_0, and the indication is included in a third bit of the short message.

* * * * *